(12) United States Patent  
Kwak et al.

(10) Patent No.: US 10,604,820 B2
(45) Date of Patent: Mar. 31, 2020

(54) METHOD OF CONTINUOUSLY ANNEALING A STRIP

(71) Applicant: POSCO, Pohang-si (KR)

(72) Inventors: Jai-Hyun Kwak, Gwangyang-si (KR); Kyoo-Young Lee, Gwangyang-si (KR); Hang-Sik Cho, Gwangyang-si (KR); Joo-Hyun Ryu, Gwangyang-si (KR); Man-Young Park, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 16/426,307

(22) Filed: May 30, 2019

(65) Prior Publication Data

US 2019/0276913 A1 Sep. 12, 2019

Related U.S. Application Data

(62) Division of application No. 15/103,078, filed as application No. PCT/KR2014/012705 on Dec. 23, 2014, now Pat. No. 10,358,691.

(30) Foreign Application Priority Data

Dec. 25, 2013 (KR) .......................... 10-2013-0163361

(51) Int. Cl.
*C21D 9/52* (2006.01)
*C21D 9/56* (2006.01)
(Continued)

(52) U.S. Cl.
CPC ................ *C21D 9/52* (2013.01); *C21D 1/26* (2013.01); *C21D 1/34* (2013.01); *C21D 1/40* (2013.01);
(Continued)

(58) Field of Classification Search
None
See application file for complete search history.

(56) References Cited

U.S. PATENT DOCUMENTS 4,358,093 A 11/1982 Shimoyama et al.
4,408,561 A * 10/1983 Yokoyama ................ C23C 2/40
118/101

(Continued)

FOREIGN PATENT DOCUMENTS

CN 1158641 9/1997
CN 1366559 8/2002
(Continued)

OTHER PUBLICATIONS

Chinese Office Action—Chinese Application No. 201480070663.9 dated Jan. 4, 2017, citing CN102812133, JP7-278680, CN1158641, CN1366559.
(Continued)

*Primary Examiner* — Jenny R Wu
(74) *Attorney, Agent, or Firm* — Cantor Colburn LLP (57) ABSTRACT

Provided is a method of continuously annealing a strip. The method includes: firstly heating a strip in a first heating zone; firstly cooling the firstly heated strip or maintaining the firstly heated strip at a constant temperature in a first cooling or constant temperature maintaining zone; secondarily heating and soaking the strip, firstly cooled or remaining at the constant temperature, in a second heating and soaking zone; and secondarily cooling the strip, secondarily heated and soaked, in a second cooling zone.

5 Claims, 4 Drawing Sheets

(51) Int. Cl.

| | | |
|---|---|---|
| *C21D 9/573* | (2006.01) | |
| *C21D 1/26* | (2006.01) | |
| *C22C 38/00* | (2006.01) | |
| *C21D 1/40* | (2006.01) | |
| *C21D 1/42* | (2006.01) | |
| *C21D 1/52* | (2006.01) | |
| *C21D 1/34* | (2006.01) | |
| *C21D 1/60* | (2006.01) | |
| *C21D 1/613* | (2006.01) | |
| *C21D 1/773* | (2006.01) | |
| *C21D 9/60* | (2006.01) | |
| *C22C 38/02* | (2006.01) | |
| *C22C 38/04* | (2006.01) | |
| *C22C 38/06* | (2006.01) | |
| *C22C 38/14* | (2006.01) | |

(52) U.S. Cl.
CPC ............ *C21D 1/42* (2013.01); *C21D 1/52* (2013.01); *C21D 1/60* (2013.01); *C21D 1/613* (2013.01); *C21D 1/773* (2013.01); *C21D 9/56* (2013.01); *C21D 9/561* (2013.01); *C21D 9/573* (2013.01); *C21D 9/60* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/14* (2013.01); *C21D 2211/005* (2013.01); *Y02P 10/253* (2015.11)

(56) References Cited

U.S. PATENT DOCUMENTS

| | | | |
|---|---|---|---|
| 4,415,382 | A | 11/1983 | Gaskey et al. |
| 4,705,579 | A | 11/1987 | Fujii |
| 9,574,249 | B2 | 2/2017 | Omura et al. |
| 2003/0047256 | A1 | 3/2003 | Kami et al. |
| 2004/0099349 | A1 | 5/2004 | Hoydick |
| 2010/0044932 | A1 | 2/2010 | Sugano et al. |
| 2010/0237548 | A1 | 9/2010 | Okada et al. |
| 2013/0074996 | A1* | 3/2013 | Omura ............... C21D 8/1244 148/645 |
| 2014/0147697 | A1 | 5/2014 | Berkhout et al. |
| 2014/0350746 | A1 | 11/2014 | Lee et al. |

FOREIGN PATENT DOCUMENTS

| | | | |
|---|---|---|---|
| CN | 101671772 | | 3/2010 |
| CN | 101942603 | | 1/2011 |
| CN | 102812133 | | 12/2012 |
| EP | 0779370 | | 6/1997 |
| JP | 57063641 | | 4/1982 |
| JP | 59133329 | | 7/1984 |
| JP | 05302126 | | 11/1993 |
| JP | 06340928 | | 12/1994 |
| JP | 07278680 | | 10/1995 |
| JP | 07278680 | A * | 10/1995 |
| JP | 10053819 | | 2/1998 |
| JP | 2003328039 | | 11/2003 |
| JP | 2003342645 | | 12/2003 |
| JP | 4110584 | | 7/2008 |
| JP | 2010222631 | | 10/2010 |
| JP | 2011174138 | | 9/2011 |
| KR | 19830005376 | | 8/1983 |
| KR | 19840007752 | | 12/1984 |
| KR | 20090102812 | | 9/2009 |
| KR | 20120105151 | | 9/2012 |
| KR | 20120118494 | | 10/2012 |
| KR | 20130067953 | | 6/2013 |
| WO | 2011105054 | | 9/2011 |
| WO | 2013010968 | | 1/2013 |

OTHER PUBLICATIONS

European Search Report—European Application No. 148736051, dated Dec. 8, 2016, citing U.S. Pat. No. 4,705,579, JP 4 110584, US 2004/099349, CN 101 942 603 and CN 101 671 772.

International Search Report—PCT/KR2014/012705 dated Mar. 30, 2015.

* cited by examiner

METHOD OF CONTINUOUSLY ANNEALING A STRIP

TECHNICAL FIELD

The present disclosure relates to an apparatus for continuous annealing of a strip that may manufacture a high-strength, high-ductility cold rolled steel sheet having improved strength and ductility, and a method for continuous annealing of the same, and more particularly, to an apparatus for continuous annealing of a strip and a method for continuous annealing of the same.

BACKGROUND ART

An existing continuous annealing apparatus that manufactures cold rolled coils includes a heating zone, a soaking zone, and a cooling zone, heats a room temperature strip to a predetermined temperature in the heating zone and the soaking zone, maintains the strip at the same temperature as the predetermined temperature for a predetermined period of time, and cools the strip up to room temperature in the cooling zone. Here, the existing continuous annealing apparatus includes an additional overaging zone or an additional constant temperature maintaining zone after the cooling zone, if necessary, to allow the strip to be subjected to an overaging treatment in the overaging zone or to remain at 600° C. or less in the constant temperature maintaining zone for a predetermined period of time, to be cooled down to room temperature, and to be austempered or martempered.

The heating zone and the soaking zone enable the cold rolled strip to be recrystallized and heated up to a temperature at which the strip may have a predetermined phase. In this case, dissolution of a carbide and recrystallization nucleation and growth of a ferrite structure are performed, and austenite appears at a temperature of $A_3$ or more. These structures all have a polygonal structure. In order to obtain an equilibrium phase suitable for a temperature, the strip may be subjected to crystal grain growth and homogenization treatment by maintaining a certain temperature for a predetermined period of time.

The cooling zone is composed of a slow cooling apparatus and a fast cooling apparatus to allow a single-phase ferrite steel to be rapidly cooled to oversaturate carbon, and to allow a complex-phase steel to be rapidly cooled to obtain a structure containing martensite, bainite, or a remaining austenite in a ferrite matrix structure through fast cooling.

In the overaging zone, oversaturated carbon of a single-phase ferrite steel is precipitated to significantly reduce amounts of solid elements in a short time period, thus improving processability. In the complex-phase steel, the martensite is tempered in the overaging zone, or bainite or bainite including a remaining austenite is formed through heat treatment of bainite at a constant temperature to control strength and ductility. The overaging zone may be removed according to purposes.

The existing continuous annealing apparatus described above has a problem in that steel components cannot be effectively controlled even by adding large amounts of alloy elements by a method of controlling the steel components and making microstructures, due to a polygonal structure obtained by recrystallization from a heating step (Japanese Patent Publication No. 2003-328039, Japanese Patent Publication No. 1984-133329).

DISCLOSURE

Technical Problem

An aspect of the present disclosure may provide an apparatus for continuous annealing of a strip that may manufacture a high-strength, high-ductility cold rolled steel sheet and a high-strength, high-ductility steel sheet for galvanizing having improved strength and ductility.

An aspect of the present disclosure may provide a method for continuous annealing of an apparatus for continuous annealing of a strip that may manufacture a high-strength, high-ductility cold rolled steel sheet and a high-strength, high-ductility steel sheet for galvanizing having improved strength and ductility.

Technical Solution

According to an aspect of the present disclosure, an apparatus for continuous annealing of a strip may include: a first heating zone configured to firstly heat a strip; a first cooling or constant temperature maintaining zone configured to cool the strip firstly heated in the first heating zone or to maintain the strip at a constant temperature; a second heating and soaking zone configured to secondarily heat and soak the strip cooled or remaining at the constant temperature in the first cooling or constant temperature maintaining zone; and a second cooling zone configured to cool the strip heated and soaked in the second heating and soaking zone.

The apparatus for continuous annealing of a strip may further include: an overaging or constant temperature maintaining zone configured to overage the strip or maintain the strip at a constant temperature in the rear of the second cooling zone; and a final cooling zone configured to cool the strip overaged or remaining at the constant temperature in the overaging and constant temperature maintaining zone.

According to another aspect of the present disclosure, a method for continuous annealing of a strip may include: firstly heating a strip in a first heating zone; firstly cooling the firstly heated strip or maintaining the strip at a constant temperature in a first cooling or constant temperature maintaining zone; secondarily heating and soaking the strip, firstly cooled or remaining at the constant temperature, in a second heating and soaking zone; and secondarily cooling the strip, secondarily heated and soaked, in a second cooling zone.

The method for continuous annealing of a strip may further include: overaging the strip or maintaining the strip at a constant temperature after secondarily cooling the strip; and cooling the strip overaged or remaining at the constant temperature.

Advantageous Effects

According to exemplary embodiments in the present disclosure, an apparatus for continuous annealing of a strip may perform heat treatment to improve drawability of an ultra-low carbon steel and to generate fine a complex-phase structure including ferrite and a second phase, thereby manufacturing a high-strength, high-ductility cold rolled steel sheet and a high-strength, high-ductility steel sheet for galvanizing having improved strength and ductility.

BEST MODE FOR INVENTION

Hereinafter, the exemplary embodiments of the present disclosure will be described in detail with reference to the attached drawings. The disclosure may, however, be exemplified in many different forms, and should not be construed as being limited to the specific embodiments set forth herein. Rather, these embodiments are provided so that this disclosure will be thorough and complete, and will fully convey the scope of the invention to those skilled in the art. The shapes or sizes of components shown in the drawings are exaggerated for clarity.

The present disclosure relates to an apparatus for continuous annealing of a strip that may manufacture a high-strength, high-ductility cold rolled steel sheet having improved strength and ductility, and a method for continuous annealing of the same.

The apparatus for continuous annealing of a strip according to the present disclosure differs from an existing continuous strip annealing apparatus cooling or overaging a strip after heating the strip one time in that a strip may be continuously annealed by a method of heating, cooling, and heating the strip. Therefore, the apparatus for continuous annealing of a strip according to the present disclosure may firstly homogenize a structure of the strip or may form the structure to have a required structure, and may then perform a reheating process of stabilizing the structure or forming the structure to have a required shape to manufacture a high-strength steel having improved workability and strength with low alloys. The apparatus for continuous annealing of a strip may also control the thicknesses of oxides and elements concentrated on the surface of the strip to manufacture a galvanized strip having a good quality plated surface.

In other words, the present disclosure may provide a novel apparatus for continuous annealing of a strip that may identify that physical properties beyond existing physical features may be obtained by various temperature rising methods, other than a single heating method, and may implement this.

Hereinafter, exemplary embodiments of the present disclosure will be described with reference to the accompanying drawings so that those skilled in the technical field to which the present disclosure pertains may easily carry out the exemplary embodiments. As easily understood by a person with ordinary skill in the art to which the present disclosure pertains, the exemplary embodiments which will be described below may be variously modified without departing from the spirit and scope of the present invention. If possible, the same or similar portions may be represented by using the same reference numerals in the drawings.

Figure 1:
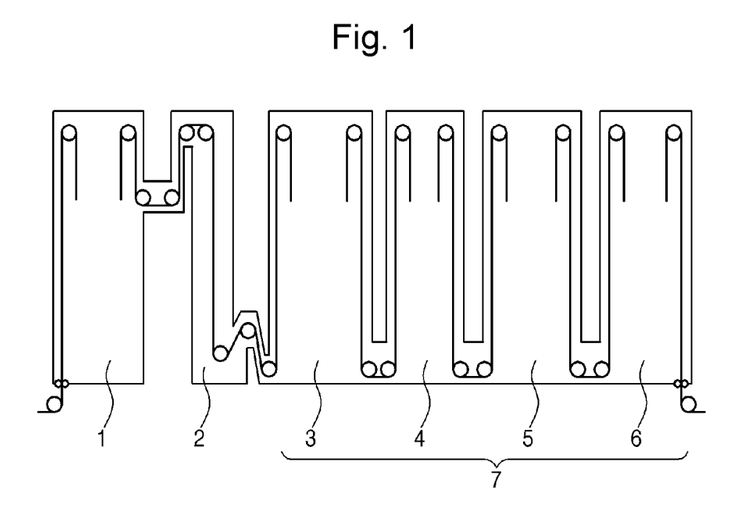
FIG. 1 is a conceptual diagram illustrating a schematic configuration of an apparatus for continuous annealing of a strip according to an exemplary embodiment in the present disclosure.

As illustrated in FIG. 1, an apparatus for continuous annealing of a strip according to an exemplary embodiment in the present disclosure may include: a first heating zone 1 configured to firstly heat a strip; a first cooling or constant temperature maintaining zone 2 configured to cool the strip firstly heated in the first heating zone 1 or to maintain the strip at a constant temperature; a second heating and soaking zone 3 configured to secondarily heat and soak the strip cooled or remaining at the constant temperature in the first cooling or constant temperature maintaining zone 2; and a second cooling zone 4 configured to cool the strip heated and soaked in the second heating and soaking zone 3.

Preferably, the first heating zone 1 and the first cooling or constant temperature maintaining zone 2 may allow a structure of the strip to be homogenized, or formed as a required structure, and the second heating and soaking zone 3 and the second cooling zone 4 may allow the structure of the strip to be stabilized, or formed to have a required shape. As such, the apparatus for continuous annealing of a strip may firstly homogenize the structure or may form the structure as a required structure, and may then perform another reheating process of stabilizing the structure or forming the structure to have a required shape to manufacture a high-strength steel having improved workability and strength with low alloys. The apparatus for continuous annealing of a strip may control the thicknesses of oxides and elements concentrated on the surface of the strip to manufacture a galvanized strip having a good quality plated surface.

In addition, the apparatus for continuous annealing of a strip may further include: an overaging or constant temperature maintaining zone 5 configured to overage the strip or maintain the strip at a constant temperature in the rear of the second cooling zone 4; and a final cooling zone 6 configured to cool the strip overaged or remaining at the constant temperature in the overaging and constant temperature maintaining zone 5.

By conducting continuous annealing treatment using the apparatus for continuous annealing of a strip according to the present disclosure including the first heating zone 1 and the first cooling or constant temperature maintaining zone 2, a strip may be heated and cooled to form martensite or bainite to generate fine structure, and may be reheated, thereby obtaining high strength and high workability with small amounts of alloy elements. By reinforcing a recrystallization texture of an ultra-low carbon steel, desirable deep drawability may be obtained.

The strip may be preferably heated in the first heating zone 1 by an induction heating method, a radiant tube heating method, or a direct fire heating method.

Figure 2:
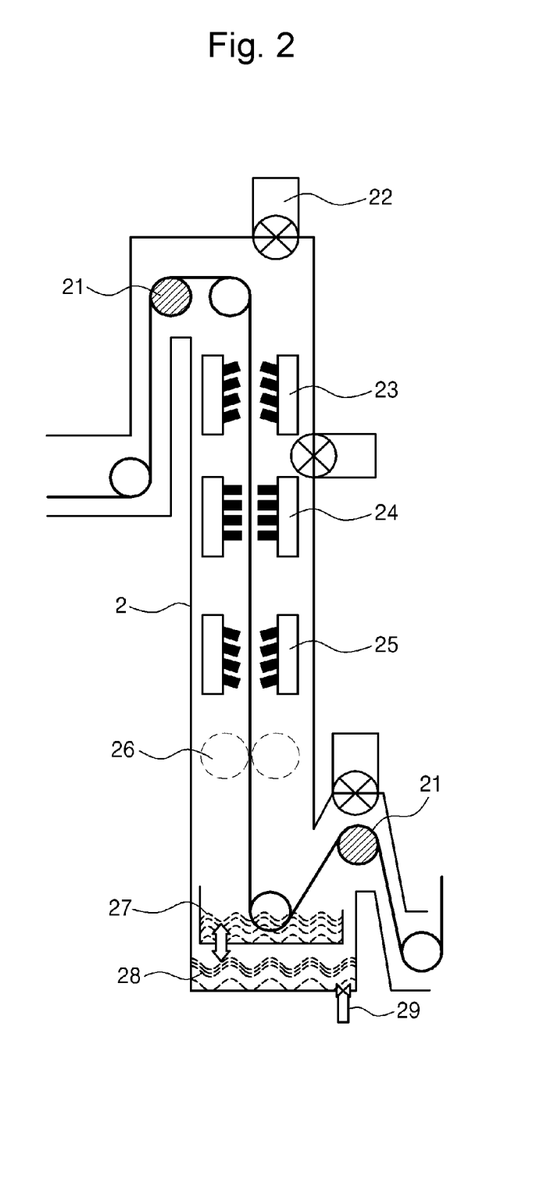
FIG. 2 is a conceptual diagram illustrating a schematic configuration of a first cooling or constant temperature maintaining zone of an apparatus for continuous annealing of a strip to an exemplary embodiment in the present disclosure.

Referring to FIG. 2, the first cooling or constant temperature maintaining zone 2 may preferably include at least one of a cooling device 23 using gases, a cooling device 24 using gases and mist, and a cooling device 25 using gases, mist, and water. If necessary, in order to control a cooling rate to be 5° C./s to 200° C./s, the devices described above may be provided.

In addition, when a plating device is provided in the rear of the apparatus for continuous annealing of a strip, all of the cooling devices 23, 24, and 25 may be preferably modified to be a gas using device. When the plating device performs plating, mist or an oxide film may be formed on a surface of the strip during water cooling thereof using water and/or mist, and thus difficulties may occur in the plating.

Tension control rolls 21 may be preferably provided on an entrance and an exit of the first cooling or constant temperature maintaining zone 2, respectively. As illustrated in FIG. 2, the tension control rolls 21 may be provided on the entrance and the exit, thus handling linear expansion of the strip by phase transformation during fast cooling thereof.

In addition, the first cooling or constant temperature maintaining zone 2 may preferably include at least one gas and steam exhaust device 22 that may generate negative pressure therein. The at least one gas and steam exhaust device 22 may prevent an oxide from being formed on the surface of the first cooling or constant temperature maintaining zone 2, and may also prevent steam from spreading to other devices provided in the front and rear thereof, when the amount of steam is increased in the first cooling or constant temperature maintaining zone 2.

Figure 3:
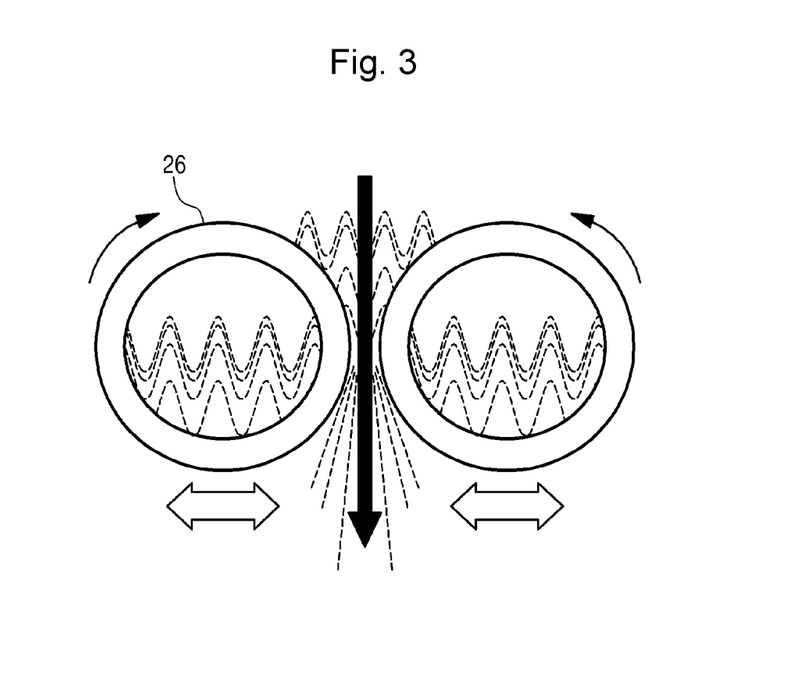
FIG. 3 is a conceptual diagram illustrating a schematic cross section and operation of a hollow water cooling roll of an apparatus for continuous annealing of a strip according to an exemplary embodiment in the present disclosure.

Referring to FIGS. 2 and 3, the first cooling or constant temperature maintaining zone 2 may include a pair of hollow water cooling rolls 26 provided in the rear of the backmost cooling device 25 in a direction in which the strip may travel; the pair of hollow water cooling rolls 26 may be disposed so that the strip cooled by the cooling devices 23, 24, and 25 may move therebetween; and the hollow water cooling rolls 26 may be preferably configured to be rotatable and to allow a coolant to flow therein, and more preferably, may be configured to move from right to left.

The hollow water cooling rolls 26 may be installed to maximize water cooling efficiency. Among gases, mist, and water generated by the cooling devices 23, 24, and 25, the water may fall downwardly due to gravity. The water may be received between the hollow water cooling rolls 26 rotating at the same speed as that of the travelling strip to be discharged through a gap therebetweeen, thus forming a water screen on the surface of the strip. Accordingly, a boiling and vaporization phenomenon may be prevented so that the strip may be uniformly cooled.

In order for the coolant to flow in the hollow water cooling rolls 26, the hollow water cooling rolls 26 may preferably have a hollow structure. By allowing the coolant to flow inside the hollow water cooling rolls 26, a surface temperature of the hollow water cooling rolls 26 may be prevented from being raised, thus may avoid the boiling and vaporization phenomenon of the water flowing down from the cooling devices 23, 24, and 25.

The hollow water cooling rolls 26 may be preferably configured to control the flux of the falling water by moving from right to left, i.e., adjusting the gap therebetween.

The coolant stored between the hollow water cooling rolls 26 may be a water coolant flowing down from the cooling devices 23, 24, and 25 positioned above the hollow water cooling rolls 26.

If all of the cooling devices 23, 24, and 25 include only the cooling device 23 using gases, it may be desirable that the hollow water cooling rolls 26 do not need to be installed, or as illustrated in FIG. 4B, the hollow water cooling rolls 26 be spaced apart from each other to have an enough gap therebetween.

Figure 4:
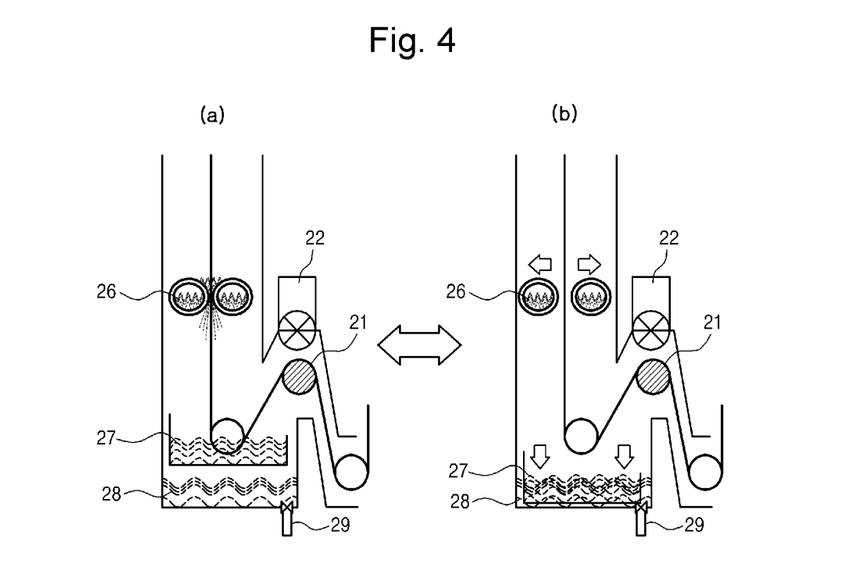
FIG. 4 is conceptual diagrams illustrating a schematic configuration and operation of a movable water cooling bath of an apparatus for continuous annealing of a strip according to an exemplary embodiment in the present disclosure, respectively.

FIG. 4 illustrates locations of a movable water cooling bath 27 before and after movements thereof, along with the movement of the hollow water cooling rolls 26. The movable water cooling bath 27 may be preferably configured to be movable in upper and lower directions. When it is unnecessary for the strip to be cooled below 80° C., the hollow water cooling rolls 26 may be opened as illustrated in FIG. 4B, and the movable water cooling bath 27 may be moved downwardly, so that the traveling strip may not contact water.

A circulating water cooling fixed bath 28 positioned in a lower portion of the first cooling or constant temperature maintaining zone 2 may have a structure in which the coolant having room temperature may continue to be circulated. Steam, generated by a contact among the movable water cooling bath 27, the circulating fixed water cooling bath 28, and a strip having a high temperature may be fully discharged through the gas and steam exhaust device 22 not to flow in the second heating and soaking zone 3. A coolant outlet 29 positioned in the bottom surface of the circulating water cooling fixed bath 28 may allow the flux of the coolant to be controlled such that mist and water sprayed by the cooling devices 24 and 25 may be discharged well and the coolant stored in the circulating water cooling fixed bath 28 may thus reach a required height.

After firstly heating the strip in the first heating zone 1, when constant temperature maintaining other than cooling is performed in the first cooling or constant temperature maintaining zone 2, the cooling devices 23, 24, and 25 may be stopped, the hollow water cooling rolls 26 may be opened, and the coolants stored in the movable water cooling bath 27 and the circulating water cooling fixed bath 28 may be emptied. A separate heating device maintaining a constant temperature is not provided in the first cooling or constant temperature maintaining zone 2, and thus a first heating temperature may be decreased. However, since a temperature of about 100° C. is not a serious problem in the crystal texture control of the ultra-low carbon steel, it does not matter a constant temperature maintaining process.

The following processes in the second heating and soaking zone 3, the second cooling zone 4, the overaging or constant temperature maintaining zone 5, and the final cooling zone 6 are not particularly limited, may use the configuration of an existing continuous strip annealing apparatus 7, and will be briefly described below.

The second heating and soaking zone 3 may be configured to allow for heating to a maximum of 950° C., and to maintain a constant temperature for 10 seconds or more. The second cooling zone 4 may include a slow cooling zone using gas cooling, and a fast cooling zone that may allow for cooling at 10° C./s or more. In addition, the overaging or constant temperature maintaining zone 5, a configuration that may be selectively added, may maintain the inside of the overaging or constant temperature maintaining zone 5 to be warm at a constant temperature using the sensible heat of the strip after the strip is cooled, or may dynamically maintain the constant temperature with heating equipment. The final cooling zone 6 that may be selectively added such as the overaging or constant temperature maintaining zone 5 may be configured to allow for cooling down to room temperature, and may include a plating device attached thereto without the configuration of the final cooling zone 6.

Hereinafter, a method for continuous annealing using the apparatus for continuous annealing of a strip described above will be described in detail.

A method for continuous annealing of a strip according to an exemplary embodiment in the present disclosure may include: firstly heating a strip in a first heating zone; firstly cooling the firstly heated strip or maintaining the firstly heated strip at a constant temperature in a first cooling or constant temperature maintaining zone; secondarily heating and soaking the strip, firstly cooled or remaining at the constant temperature, in a second heating and soaking zone;

and secondarily cooling the strip, secondarily heated and soaked, in a second cooling zone.

The method for continuous annealing of a strip may further include: overaging the strip or maintaining the strip at a constant temperature after secondarily cooling the strip; and cooling the strip overaged or remaining at the constant temperature.

In the first heating zone, the strip may be preferably heated by an induction heating method, a radiant tube heating method, or a direct fire heating method. By selecting the heating method described above, a temperature rising rate may be controlled to be 3° C./s to 150° C./s, and heating to a maximum of 1000° C. may be preferable to prevent an increase in energy costs, a deterioration in steel strength, and a reduction in threading properties.

The first heating zone 1 may be configured to maintain a constant temperature, may have a problem in that a line length is longer, and therefore, may be preferably configured to maintain the constant temperature within 10 seconds.

In the first cooling or constant temperature maintaining zone 2, cooling or maintaining at the constant temperature may be preferably performed by at least one of a gas cooling method, a mist cooling method spraying a water and gas mixture, and a water cooling method directly spraying water. Preferably, the abovementioned cooling method may allow a cooling rate to be controlled to 5° C./s to 200° C./s, and may enable cooling to a minimum of 80° C. in order to increase ductility.

When a plating process is involved after the continuous annealing process is finished, cooling or maintaining at the constant temperature in the first cooling or constant temperature maintaining zone 2 may be preferably performed by the gas cooling method.

The first cooling or constant temperature maintaining step may be preferably performed in a state in which a tension of ⅕ to ⅗ of yield strength of the strip is applied to the strip. The tension control rolls 21 of the first cooling or constant temperature maintaining zone 2 may be preferably provided on opposite ends of the first cooling or constant temperature maintaining zone 2 to thus handle linear expansion of the strip caused by phase transformation during fast cooling thereof. The tension control rolls 21 may preferably apply tension of ⅕ to ⅗ of yield strength of the strip to the strip.

In order to control a sheet shape using transformation induced plasticity in the cooling step, tension may be controlled to be applied to the strip by ⅕ to ⅗ of the yield strength of the strip, so that the transformation induced plasticity may allow the sheet shape to be corrected. In order to prevent the case in which, when austenite is transformed into bainite or martensite through fast cooling, linear expansion may occur and non-uniform cooling may cause a phenomenon in which the sheet is distorted so that the sheet may be deformed, the present disclosure may artificially perform step-by-step cooling and apply tension to correct the sheet shape. This inventor discovered that, when tension is applied to the sheet by ⅕ to ⅗ of yield strength of the strip, volume thereof may be expanded only in a direction of the applied tension so that the sheet may be planarized. Therefore, the tension control rolls 21 may be provided on the entrance and exit of the first cooling or constant temperature maintaining zone 2, respectively, to provide tension to the strip by ⅕ to ⅗ of yield strength of the strip.

The first cooling or constant temperature maintaining step may be preferably performed in a state of negative pressure.

A steel sheet manufactured by the abovementioned method for continuous annealing of a strip according to an exemplary embodiment in the present disclosure may have a higher rank ford value (r) than that of a common thermal treatment method in the case of an ultra-low carbon steel, thus improving drawability and generate fine a complex-phase structure of ferrite and a second phase, thus manufacturing a high-strength, high-ductility cold rolled steel sheet and a high-strength, high-ductility steel sheet for galvanizing having improved strength and ductility.

MODE FOR INVENTION

Hereinafter, the present disclosure will be described in more detail through embodiments thereof.

A steel slab including a composition illustrated in Table 1 below was manufactured by vacuum induction melting, was heated and extracted at 1200° C., and was finally hot rolled within a range of 900° C. or more. The thickness of a hot rolled steel sheet may be 3.2 mm. The hot rolled steel sheet remained at a temperature of 500° C. to 700° C. for 1 hour, and was furnace cooled to room temperature. Scales thereof were removed, and a cold rolled steel sheet having a thickness of 1 mm was manufactured.

An infrared heating device performs an existing heat treatment method and a heat treatment method of the present disclosure. With a tension test, a Rank Ford (r) value, an indicator representing plastic anisotropy, was measured at 15% strain. In the case of an ultra-low carbon steel, a crystal texture thereof was analyzed through electron back scattered diffraction (EBSD) analysis. The EBSD analysis may include grinding a thermally treated test specimen to the thickness of ¼t point thereof, removing a remaining stress of the surface thereof through electrolytic polishing, and measuring the strength of the crystal texture in a direction of the surface. In a tension test, the test specimen was machined to an ASTM standard size, and yield strength (YS), tensile strength (TS), and elongation percentage (E1) thereof was measured.

TABLE 1

| | Steel type | | | | | | | |
|---|---|---|---|---|---|---|---|---|
| | C | Mn | Si | P | S | Al | Ti | N |
| Ultra-low carbon steel | 0.003 | 0.25 | Tr | 0.011 | 0.008 | 0.03 | 0.05 | 0.002 |
| Alloy steel | 0.2 | 1.5 | 1.5 | 0.009 | 0.005 | 0.04 | Tr | 0.004 |

In Inventive Example 1, the thermal treatment of the present disclosure was performed for a steel having the composition of the ultra-low carbon steel illustrated in Table 1 above. Similar to the maintenance of a constant temperature, the steel was subjected to a first heat treatment including heating the steel to 700° C. at 5° C./s and cooling the steel to 620° C. at 5° C./s. The steel might have remained at a temperature of 700° C. for 16 seconds, but was cooled to 620° C. since the temperature was expected to be decreased in a cooling zone having no heating device. For a second heat treatment, the steel was commonly heated to 850° C. at 5° C./s, remained at 850° C. for 60 seconds, was slow cooled to 650° C. at 5° C./s, was fast cooled to 400° C. at 15° C./s, remained at 400° C. for 120 seconds, and was air cooled at room temperature.

A steel of Comparative Example 1 having the composition of the ultra-low carbon steel and thermally treated by the existing heat treatment method was thermally treated in the same manner as the second heat treatment. Namely, without the first heat treatment the same as before, the steel was heated to 850° C. at 5° C./s, remained at 850° C. for 60 seconds, was slow cooled to 650° C. at 5° C./s, was fast cooled to 400° C. at 15° C./s, remained at 400° C. for 120 seconds, and was air cooled at room temperature.

TABLE 2

| Division | $\varphi_1$ | $\varphi_2$ | $\varphi$ | Texture | f(g) | YS | TS | EI | r |
|---|---|---|---|---|---|---|---|---|---|
| Inventive | 60 | 45 | 55 | {111}<110> | 13.1 | 18 | 29 | 48 | 2.69 |
| Example 1 | 90 | 45 | 55 | {111}<112> | 9.6 | | | | |
| Comparative | 60 | 45 | 55 | {111}<110> | 10.4 | 19 | 29 | 45 | 2.28 |
| Example 1 | 90 | 45 | 55 | {111}<112> | 6.2 | | | | |

As illustrated in Inventive Example 1 of Table 2 above, the heat treatment of the present disclosure may allow the strength of a {111} crystal texture advantageous to processability to be increased, and an elongation percentage, particularly an r value that is a plastic anisotropy value, may thus be satisfactory so as to be beneficial to the manufacture of a core machined component. {111}<110>-{111}<112> crystal textures are called gamma texture, and in an early stage of recrystallization, the crystal textures with {100} and {110} orientations may be developed, but may be slowly grown. However, in the temperature interval of 600° C. to 750° C., the {111} crystal texture may be actively grown, and the {111} crystal texture may thus be further developed.

As a heat treatment apparatus of Inventive Example 1, when the temperature of the steel of Inventive Example 1 is maintained to be constant at about 700° C. and continues to be raised to a higher temperature than the constant temperature, the strength of the {100} and {110} crystal textures having a growth rate less than that of the {111} crystal texture may become very low. Since the existing heat treatment method may allow the temperature to continue to be raised to a higher temperature, the amount of the {111} crystal texture may be reduced in the early stage of recrystallization so that the strength of the {100} and {110} crystal textures may be relatively increased.

Next, a complex-phase steel was manufactured by using a steel having a composition of an alloy steel illustrated in Table 1. Steels of Inventive Examples 2 to 4, which were thermally treated by the apparatus for continuous annealing of a strip of the present disclosure, were heated to 900° C. at 5° C./s and were cooled to 80° C. to 300° C., which was a temperature of Ms or less, at 15° C./s, as illustrated in Table 3 below. In addition, the steels of Inventive Examples 2 to 4 were subjected to the first heat treatment, and then were heated to 820° C. at 5° C./s, remained at 820° C. for 60 seconds, were slow cooled to 650° C. at 5° C./s, were fast cooled to 400° C. at 15° C./s, remained at 400° C. for 120 seconds, and were air cooled at room temperature, for a second heat treatment the same as before.

A steel of Comparative Example 2, which was obtained by thermally treating the steel having the composition of the alloy steel illustrated in Table 1 above by the existing continuous strip annealing apparatus, was thermally treated in the same manner as the second heat treatment. Namely, without the first heat treatment the same as before, the steel was heated to 820° C. at 5° C./s, remained at 820° C. for 60 seconds, was slow cooled to 650° C. at 5° C./s, was fast cooled to 400° C. at 15° C./s, remained at 400° C. for 120 seconds, and was air cooled at room temperature.

TABLE 3

| Division | First annealing temperature | First cooling temperature | Second annealing temperature | YS | TS | EI |
|---|---|---|---|---|---|---|
| Inventive Example 2 | 900 | 80 | 820 | 615 | 1012 | 22 |
| Inventive Example 3 | 900 | 200 | 820 | 632 | 1008 | 26 |
| Inventive Example 4 | 900 | 300 | 820 | 658 | 998 | 26 |
| Comparative Example 2 | — | — | 820 | 420 | 1072 | 17 |

Figure 5:
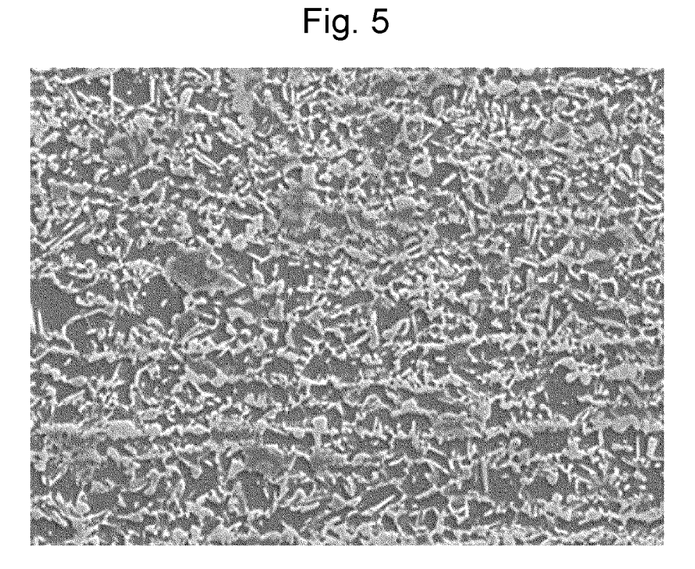
FIG. 5 is a photograph obtained by imaging a microstructure of Comparative Example 2 annealed by an existing continuous strip annealing apparatus.
Figure 6:
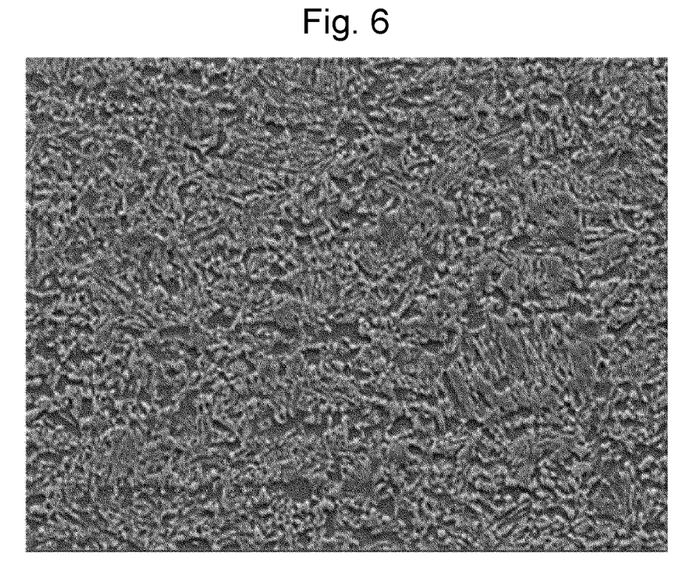
FIG. 6 is a photograph obtained by imaging a microstructure of Inventive Example 3 annealed by an apparatus for continuous annealing of a strip according to an exemplary embodiment in the present disclosure.

As illustrated in Table 3 above, when the alloy steel is thermally treated using a method using the apparatus for continuous annealing of a strip of the present disclosure rather than a method using the existing continuous strip annealing apparatus, significantly excellent ductility may be obtained. The reason for this may be confirmed through a comparison between a structure of Comparative Example 2 illustrated in FIG. 5 and that of Inventive Example 3 illustrated in FIG. 6. In FIG. 6 illustrating Inventive Example 3, the amount of martensite included in the thermally treated structure may be far less, whereas ferrite, bainite, and martensite structures may be four or more times finer. Therefore, the tensile strength of the structure of Inventive Example 3 may be similar to that of the structure of Comparative Example 2, but the yield strength of the structure of Inventive Example 3 may be higher than that of the structure of Comparative Example 2, and an elongation percentage of the structure of Inventive Example 3 may be significantly excellent. The reason for a difference between the structures is as follows.

When the alloy steel is heated using the existing heat treatment method, ferrite cores may be generated from a large amount of potential energy formed by cold rolling, and may be grown. When the heating temperature reaches 700° C. or more, the amount of solid carbon included in ferrite may be increased while a hot-rolled eutectoid carbide is dissolved. When the heating temperature at which austenite may appear reaches 780° C. or more, austenite may appear in the grain boundary of the ferrite, and carbon may be concentrated into austenite. As the heating temperature is higher, the amount of the austenite may be gradually increased, and the ferrite or the austenite may all have a polygonal shape. In a soaking zone, the ferrite and the austenite may have an equilibrium percentage at a certain temperature. As the heating temperature is decreased to 650° C. in a slow cooling zone, epitaxial ferrite may appear. This may be ferrite grown toward the austenite in the grain boundary of the ferrite and the austenite. When the alloy steel is fast cooled to 400° C., bainite may appear from the austenite, carbon may be concentrated to about 1% in a remaining austenite to be stabilized, and a martensite formation temperature may be room temperature or less. However, since carbon is not fully concentrated in the center of the austenite or in coarse austenite, the martensite formation temperature may be room temperature or more. In the final cooling process, the center of the austenite or the coarse austenite may be transformed into martensite. Therefore, the structure obtained by using the existing heat treatment method may include coarse ferrite, bainite appearing from austenite, fine remaining austenite, and martensite as illustrated in FIG. 5. The ferrite may have a great crystal grain, and may have a low carbon concentration so as to have a low yield strength. Since the ferrite is primarily transformed and has a great difference between strength thereof and that of a second phase, microvoids may be formed, and cracks may rapidly spread along an interface between the ferrite and the second phase. Therefore, an elongation percentage may be decreased.

Meanwhile, the entire structure of Inventive Example 3 may be transformed into coarse polygonal austenite through first heating, and a significant portion of the structure may be transformed into martensite through fast cooling to 200° C., so that Inventive Example 3 may have a structure of the martensite and a remaining austenite. The martensite may include a large amount of potential energy, and when a temperature is higher, dislocation density and an area percentage of the martensite may be reduced. Then, when the Inventive Example 3 is heated secondarily, carbon oversaturated with a high concentration may move from the martensite to the austenite. The martensite may have a square structure in which lattice constants thereof may be the same as each other to be transformed into ferrite, and the carbon concentrated into the austenite may stabilize the austenite. This is referred to as reverse transformation, a core mechanism refining the structure by the second heat treatment of the present disclosure. Then, the Inventive Example 3 may be slow cooled to 650° C. so that the ferrite may be formed as quasi-polygonal ferrite. Accordingly, the heat treatment by the apparatus for continuous annealing of a strip may allow the fine quasi-polygonal ferrite and the fine austenite to appear, thereby obtaining a ferrite structure more than four times finer than the existing heat treatment method. Then, the Inventive Example 3 is subjected to isothermal transformation of the bainite at 400° C., bainite may appear from finely dispersed austenite having a bar shape. Since an austenite/bainite area is much finer than that of the polygonal austenite obtained by the existing heat treatment method, the austenite/bainite area may be increased to smoothly stabilize the austenite so that the amount of the remaining austenite may be greatly increased, thus improving ductility.

Therefore, the continuous annealing treatment using the apparatus for continuous annealing of a strip of the present disclosure may allow the amount of the martensite to be reduced to slightly decrease tensile strength, may allow yield strength to be increased by the refined ferrite structure, and may allow the remaining austenite to be further stabilized, thus improving ductility. Use of the same alloy steel may also allow the first cooling temperature to be controlled, thus adjusting yield strength. The reason why the yield strength is increased when the first cooling temperature is higher is because, since the amount of a thermal martensite is reduced when the first cooling temperature is higher and the amount of austenite is increased, the amount of ferrite grown to consume potential energy may be reduced along with the spread of carbon during the secondary heating, so that the ferrite structure may be made finer.

As illustrated in Tables 2 and 3 and FIGS. 5 and 6, an ultra-low carbon steel forming a steel sheet manufactured by the apparatus for continuous annealing of a strip of the present disclosure may have improved drawability since an r value is higher than that obtained in the common heat treatment method, and may include a fine complex-phase structure of ferrite and a second phase, so that a high-strength, high-ductility cold rolled steel sheet and a high-strength, high-ductility steel sheet for galvanizing may be manufactured.

As described above, even though exemplary embodiments of the present disclosure have been described with reference to the drawings, various modifications and other exemplary embodiments may be performed by those skilled in the art. The modifications and other exemplary embodiments are considered and included in the accompanying claims to be within the scope of the present invention.

What is claimed are:

1. A method of continuously annealing a strip comprising:
    firstly heating a strip in a first heating zone to form a first heated strip:
    firstly cooling the first heated strip or maintaining the first heated strip at a first constant temperature in a first cooling or constant temperature maintaining zone to form a first cooled strip;
    secondarily heating and soaking the first cooled strip in a second heating and soaking zone to form a second heated strip;
    secondarily cooling the second heated strip in a second cooling zone to form a second cooled strip,
    overaging the second cooled strip, or maintaining the second cooled strip at a second constant temperature to form an overaged strip; and cooling the overaged strip;
    wherein the firstly cooling is performed while negative pressure is generated;
    wherein the firstly cooling the first heated strip or the maintaining the first heated strip is performed in a state in which a tension is applied to the first heated strip;
    wherein the tension is ⅕ to ⅗ of yield strength of the strip.

2. The method of claim 1, wherein the firstly heating comprises: heating the strip to a maximum of 1000° C. at a temperature rising rate of 3° C./s to 150° C./s, and holding the first heated strip for 10 seconds or less.

3. The method of claim 1, wherein the firstly cooling comprises: cooling the first heated strip to a minimum of 80° C. at a cooling rate of 5° C./s to 200° C./s.

4. The method of claim 1, wherein the firstly heating is performed by an induction heating method, a radiant tube heating method, or a direct fire heating method.

5. The method of claim 1, wherein the firstly cooling is performed by at least one of a gas cooling method, a hydrogen cooling method, a mist cooling method of mixing and spraying water and gas, and a water cooling method of directly spraying water.

* * * * *